(12) United States Patent
Krebs et al.

(10) Patent No.: US 8,257,786 B2
(45) Date of Patent: Sep. 4, 2012

(54) DECOMPOSABLE VEHICLES IN PRINTING OR COATING COMPOSITIONS

(75) Inventors: Frederik Krebs, Lyngby (DK); Mikkel Joergensen, Glostrup (DK)

(73) Assignee: The Technical University of Denmark, Lyngby (DK)

( * ) Notice: Subject to any disclaimer, the term of this patent is extended or adjusted under 35 U.S.C. 154(b) by 778 days.

(21) Appl. No.: 12/297,232

(22) PCT Filed: Apr. 13, 2007

(86) PCT No.: PCT/EP2007/053614
§ 371 (c)(1), (2), (4) Date: Oct. 15, 2008

(87) PCT Pub. No.: WO2007/118850
PCT Pub. Date: Oct. 25, 2007

(65) Prior Publication Data
US 2009/0280245 A1    Nov. 12, 2009

(30) Foreign Application Priority Data

Apr. 18, 2006   (GB) .................................. 0607668.1

(51) Int. Cl.
B05D 3/02 (2006.01)
H01B 1/06 (2006.01)
C08K 3/04 (2006.01)

(52) U.S. Cl. ........ 427/227; 524/306; 524/495; 252/511; 558/260; 558/270; 558/275

(58) Field of Classification Search .................. 427/227; 524/306, 495; 252/511; 558/260, 270, 275
See application file for complete search history.

(56) References Cited

U.S. PATENT DOCUMENTS

| | | | | |
|---|---|---|---|---|
| 3,378,532 A | * | 4/1968 | Fritz et al. | 524/111 |
| 3,821,334 A | * | 6/1974 | Schmidt et al. | 558/87 |
| 4,281,329 A | * | 7/1981 | Yano et al. | 347/100 |
| 4,931,093 A | * | 6/1990 | Brenke et al. | 106/31.57 |
| 5,633,328 A | * | 5/1997 | Tsujinaka et al. | 524/589 |
| 6,197,122 B1 | * | 3/2001 | Ober et al. | 134/2 |
| 6,465,680 B2 | * | 10/2002 | Lee et al. | 560/179 |
| 6,602,334 B1 | * | 8/2003 | Kaufmann | 106/31.58 |
| 6,657,031 B1 | | 12/2003 | Crane et al. | |
| 2002/0035290 A1 | * | 3/2002 | Lee et al. | 560/175 |
| 2002/0084445 A1 | * | 7/2002 | Garbe | 252/364 |
| 2003/0035917 A1 | * | 2/2003 | Hyman | 428/67 |

FOREIGN PATENT DOCUMENTS

| | | |
|---|---|---|
| EP | 0748775 | 12/1996 |
| EP | 1 344 109 | 9/2003 |
| EP | 1 502 929 | 2/2005 |
| GB | 2 373 866 | 10/2002 |
| WO | 00/69235 | 11/2000 |
| WO | 02/46507 | 6/2002 |

OTHER PUBLICATIONS

Behloul et al, Tetrahedron (2005), 61 (39), Abstract on pp. 31-32 of STN Structure search report by USPTO in Nov. 2011.*
Van Speybroeck et al, International Journal of Quantum Chemistry (2003), 91 (3) and Journal of American Chemical Society (2001), 123 (43), Both Abstracts on pp. 32-35 of STN Structure search report by USPTO in Nov. 2011.*
Grilly, et al., "Sulfoxide Solvents and Surfactants for Facile Separations", Processing of Pharmaceuticals and Nutraceuticals under High Pressure, http://aiche.confex.com/aiche/2005/techprogram/P27720.HTM, Nov. 4, 2005 Annual Meeting, University of Cincinnati, Cincinnati, OH.
International Search Report published with PCT/EP2007/053614, Jul. 26, 2007, 2 pages.

* cited by examiner

*Primary Examiner* — Tae H Yoon
(74) *Attorney, Agent, or Firm* — Pillsbury Winthrop Shaw Pittman LLP

(57) ABSTRACT

A printing or coating composition has a non-volatile liquid vehicle carrying a conductive polymer to be deposited on a substrate and is cleavable by heat or acidification without decomposition of said material, cleavage of said vehicle producing decomposition products that are more volatile than said vehicle and which can be evaporated to dry the composition. Suitably, that vehicle is a carbonic acid diester or a malonic acid diester, e.g. of the formula: wherein $R_2$ is an organic substituent such that $R_2$—OH is a volatile alcohol; R1 is an aliphatic or aromatic substituent of more than three carbon atoms such that is volatile; and $R_3$ is $C_{1-3}$ alkyl.

11 Claims, 3 Drawing Sheets

DECOMPOSABLE VEHICLES IN PRINTING OR COATING COMPOSITIONS

CROSS REFERENCE TO RELATED APPLICATIONS

This is the U.S. National Phase of PCT/EP2007/053614, filed Apr. 13, 2007, which in turn claims priority to British application No. 0607668.1, filed Apr. 18, 2006, the entire contents of both of which are incorporated herein by reference.

The present invention relates to the use of decomposable vehicles as suspending agents or solvents in compositions for coating or printing on substrates.

Conventionally, coating compositions or printing compositions are applied in a liquid state to a substrate and are caused to dry by evaporation of a liquid vehicle therefrom or by a chemical reaction that solidifies the vehicle. The former requires a volatile vehicle. Some liquids which have very desirable solvent properties and which are suitably volatile are noxious either in respect of their toxicity or smell or environmental impact.

A general problem with compositions based on volatile vehicles is that of premature drying of the vehicle on printing screens or on applicators such as brushes leading to these having to be cleaned or discarded.

Also, conventional solvents allow only a limited range of viscosities of coating or printing compositions, restricting the thickness of layers that can be laid down.

The present invention provides a printing or coating composition comprising a material to be deposited on a substrate and a non-volatile liquid vehicle for said material in which said material is suspended or dissolved, wherein the liquid vehicle is cleavable without decomposition of said material, cleavage of said vehicle producing decomposition products that are more volatile than said vehicle and which can be evaporated to dry the composition.

In a composition of the invention, the vehicle is preferably cleavable by heating and/or by acidification. Preferably, the vehicle is cleavable simply by heating. Preferably, the vehicle decomposes at a temperature of below 200° C., more preferably below 175° C., most preferably below 150° C.

Preferably, all of the decomposition products of said vehicle are volatile so that they may all be removed from the material being deposited by heating and/or by the application of vacuum. Preferably, the volatile decomposition products have a boiling point at atmospheric pressure of below 200° C., more preferably below 175° C., most preferably below 150° C. Preferably, they do not react with the material to be deposited.

Preferably, the vehicle does not decompose below 100° C., and since it does not boil below its decomposition temperature is therefore non-volatile. Preferably, said vehicle is a carbonic acid diester or a malonic acid diester. Several new such compounds are disclosed herein.

Preferably, the composition is a printing ink. In a composition of the invention, including in the said printing inks, the material to be deposited may comprise an electrically conductive polymer, a photovoltaic polymer, or an electroluminescent polymer. Suitably, the material to be deposited is a poly(phenylenevinylene) (PPV), poly(p-phenyleneethynylene) (PPE), or poly(arylene) type polymer. The material to be deposited may be a poly[2-methoxy-5-(2'-ethylhexyloxy)-p-phenylenevinylene] (MEH-PPV), poly[2-methoxy-5-(3',7'-dimethyloctyl)-p-phenylenevinylene] (MDMO-PPV), poly(3-hexylthiophene) (P3HT), poly(N-phenylamino-1,4-phenylene-1,2-ethylene-1,4-(2,5-dioctoxy)-phenylene-1,2-ethylene-1,4-phenylene) (PA-PPV), or poly(9,9'-dioctylfluorene-co-bithiophene) (PDFTH).

Compositions of the invention may further comprise a filler or viscosity modifier which is solid at 25° C. but which like the vehicle is cleavable without decomposition of said material, cleavage of said vehicle producing decomposition products that are more volatile than said vehicle and which can be evaporated to dry the composition. Preferred characteristics of the vehicle described herein apply also to such fillers or viscosity modifiers. Thus, for instance, the filler or viscosity modifier is preferably cleavable by heating and/or by acidification.

An advantage of using a thermally decomposable filler or viscosity modifier is that it enables a more viscous formulation to be provided which can therefore be printed as a thicker wet layer without the finished dry layer being commensurately thick. To produce a very thin, defect free dry printed layer is difficult because if the wet printed layer is thin, the thinness is likely to cause defects when dry. If one simply adds more solvent, more material would be removed in the drying process so that the reduction in thickness on drying would be greater, but with a conventional solvent system, the increased solvent content would reduce the viscosity and this would reduce the thickness of the wet layer that could be printed. Adding a conventional filler to increase the viscosity would lead to a reduction in the degree of thinning of the layer on drying.

The thermocleavable fillers or viscosity modifiers of the present invention allow a way out of this dilemma as they can be included in the printing ink to raise the viscosity and allow the printing of a thicker wet layer, but by decomposing during the drying process, they do not contribute to the final dry layer thickness. This allows the printing of a thinner, defect free, dry layer.

The invention includes a method of applying a material to a substrate comprising applying to the substrate a composition as described herein, heating and/or acid treating the composition to decompose the vehicle component of the composition and any decomposable filler or viscosity modifier which is present, and drying the composition.

Suitably, the composition is applied to the substrate by printing, spin coating, drop casting, casting, or painting, but preferably the composition is applied to the substrate by screen printing.

The invention includes a thermally decomposable solvent or filler of the formula:

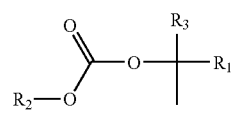

wherein $R_2$ is an organic substituent such that $R_2$—OH is a volatile alcohol; $R_1$ is an aliphatic or aromatic substituent of more than three carbon atoms such that

is volatile or is itself thermally decomposable to volatile products; and $R_3$ is $C_{1-3}$ alkyl. $R_1$ may for instance be phenyl.

The group $R_1$ may alternatively be of the form

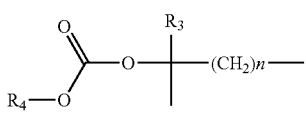

where n is from 0 to 3, e.g. 1 or 2, and
where $R_4$ is an organic substituent such that $R_4$—OH is a volatile alcohol, and may be the same as $R_2$.

Further, the invention includes a thermally decomposable solvent or filler of the formula:

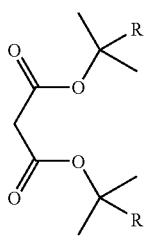

wherein R is an aliphatic or aromatic substituent of more than three carbon atoms such that

is volatile, e.g. R is phenyl or substituted phenyl, such as alkyl (e.g. $C_{1-3}$ alkyl) or halogen.

Compositions of the invention may comprise as materials to be applied to a substrate components in solution, components in suspension, or both.

We present here examples of solvents/fillers that after a heat treatment form small volatile products that can be removed by evaporation either at ambient conditions, at reduced pressure, by heating or with any combination of these conditions. Other examples include water miscible thermo-cleavable solvents/fillers.

These compounds can be used as solvents/fillers to dissolve or suspend inks for printing (screen printing, spin coating, drop casting, casting, painting etc). They are characterized by being relatively non-volatile at ambient temperature, but undergoing a specific chemical reaction during a heat treatment leaving more volatile smaller components that may be removed easily through evaporation.

There are several benefits from this. The non-volatile solvents/fillers are much easier to work with since the ink or other coating composition will not dry out during the application operation. A larger range of viscosities may be attained which allows for controlling film thickness and obtaining larger film thicknesses. Non-volatile solvents/fillers are generally also odourless or low in odour and may be much less toxic and irritating than volatile solvents, thus increasing safety and easy handling. Thicker films can be obtained using printing techniques such as screen printing since the proportion of thermo-cleavable solvent or filler in the printed film can be varied to increase the viscosity. More homogeneous films may also be obtained through the heat treatment.

The specific temperature range at which the solvents/fillers undergo thermo-cleavage can be controlled by selection of their detailed chemical nature. In the following examples, certain esters of secondary and preferably tertiary alcohols have been prepared and investigated for their properties as solvents/fillers and their decomposition temperatures. Further tuning of the decomposition temperature may be achieved by introduction of electron donating or withdrawing groups.

Another important issue is the ability of these solvents/fillers to dissolve other compounds such as colorants, film forming polymers, electro active and photoactive polymers. This property can be addressed by incorporating branched selected subsidiary groups and substituents such as alkyl groups, aryl groups, and ether groups.

This invention finds application within the fields of: polymer solar cells, organic field effect transistors, organic light emitting diodes, and organic electro active materials.

One class of thermo-cleavable solvents useful in the invention is that of carbonic esters of alcohols. Esters of secondary or tertiary alcohols, especially the tertiary alcohols are preferred as they decompose at lower temperatures. Benzylic esters of carbonic acid also cleave readily. These esters can easily undergo thermal cleavage above 100° C. according to the general scheme (showing a tertiary ester by way of illustration):

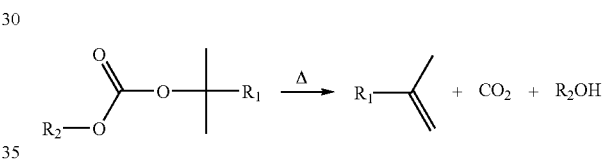

where $R_1$ and $R_2$ may be any alkyl, aryl or ether group.

They may be prepared according to the general synthetic scheme:

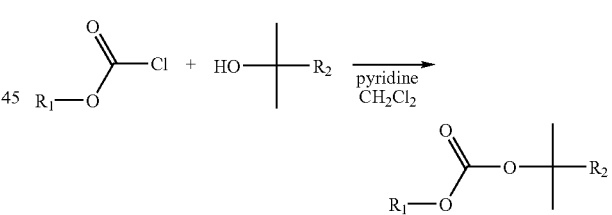

In a typical procedure, a chloroformiate ester (e.g. phenyl chloroformiate 0.14 mol) is added dropwise to a solution of a tertiary alcohol (e.g. 2-phenyl-propan-2-ol, 0.14 mol) in methylene chloride (250 mL) together with pyridine (20 mL) taking care that the temperature does not exceed 0° C.). The reaction mixture is stirred overnight to complete the reaction. Ice cold water is added and the organic phase is separated and extracted once more with water to remove water soluble by products. The organic phase is dried over magnesium sulphate, filtered and evaporated under reduced pressure to give the product as an oil.

A further class of useful solvent compounds is malonic acid diesters of secondary and more preferably tertiary alcohols. These decompose above 100° C. according to the general scheme:

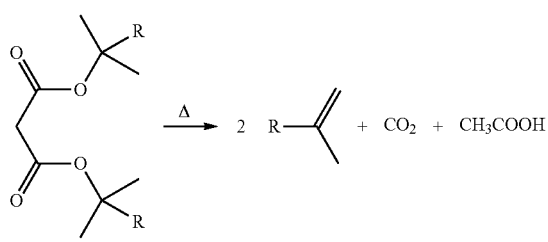

Other thermo-decomposable solvents have been described by J. D. Grilly (Georgia Institute of Technology December 2005-Masters Thesis), namely thiirane oxide and piperylene sulphone. However, these produce reactive and/or non-volatile by products on thermal decomposition and would therefore not be suitable for our purposes in making printing inks containing electroactive or photoactive polymers.

Examples of suitable thermo-cleavable solvents include the following:

1. Carbonic acid tert-butyl ester phenyl ester (commercial sample, Aldrich)

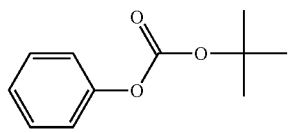

2. Carbonic acid 1-ethyl-1,4-dimethyl-pentyl ester phenyl ester

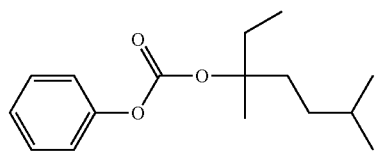

3. Carbonic acid 1-ethyl-1,4,8-trimethyl-nonyl ester phenyl ester

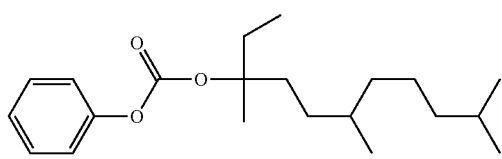

4. Carbonic acid 1-ethyl-1,4,8,12-tetramethyl-tridecyl ester phenyl ester

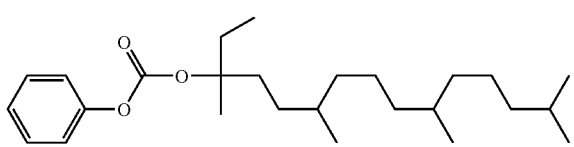

5. Carbonic acid 2-phenoxycarbonyloxy-1,1,2-trimethyl-propyl ester phenyl ester

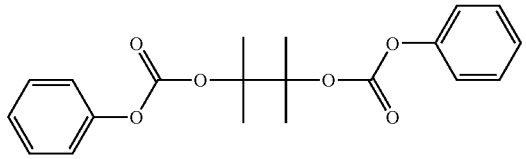

6. Carbonic acid 4-phenoxycarbonyloxy-1,1,4-trimethyl-pentyl ester phenyl ester

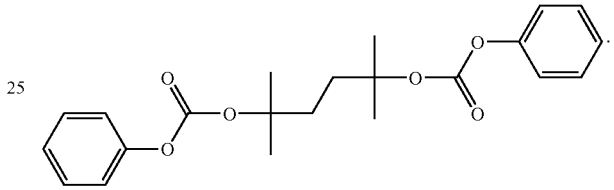

7. Carbonic acid 1-methyl-1-phenyl-ethyl ester phenyl ester

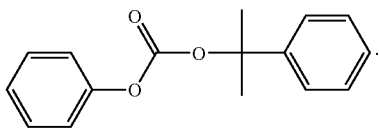

8. Carbonic acid 1-methyl-1-phenyl-propyl ester phenyl ester

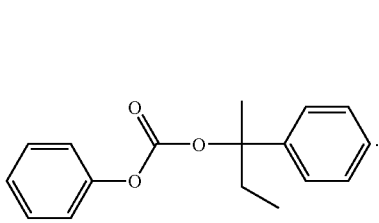

9. Carbonic acid 3-{2-[2-(2-methoxy-ethoxy)-ethoxy]-ethoxy}-1,1-dimethyl-propyl ester phenyl ester

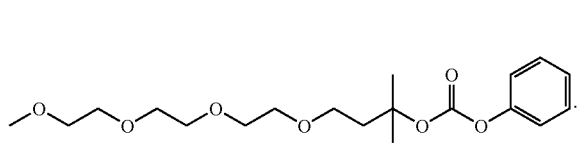

10. Malonic acid bis-(1-methyl-1-phenyl-ethyl) ester

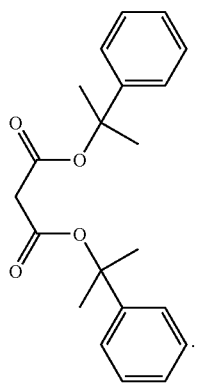

11. Malonic acid bis-(1-methyl-1-p-tolyl-ethyl) ester

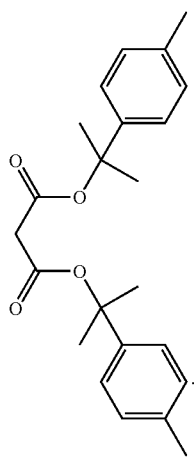

12. Malonic acid bis-[1-(4-chloro-phenyl)-1-methyl-ethyl] ester

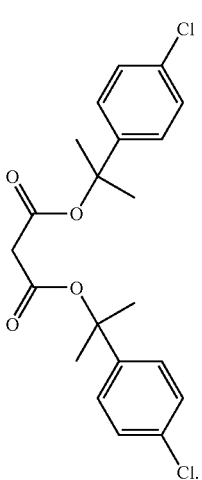

13. Malonic acid bis-(1-phenyl-ethyl) ester (Moody, Christopher J.; Miah, Soyfur; Slawin, Alexandra M. Z.; Mansfield, Darren J.; Richards, Ian C; J. Chem. Soc. Perkin Trans. 1; 24; 1998; 4067-4076)

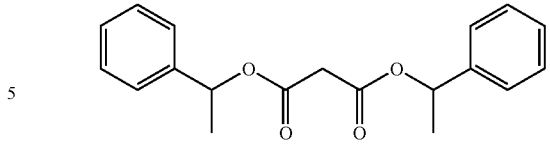

Compounds 6 and 12 are solid at room temperature and are suitable for use as fillers or viscosity modifiers as described above.

With the exception of compound 1 and compound 13, these are believed to be novel and accordingly, the present invention includes each of these compounds.

EXAMPLE 1

Thermal cleavage of Carbonic acid 1-methyl-1-phenyl-ethyl ester phenyl ester

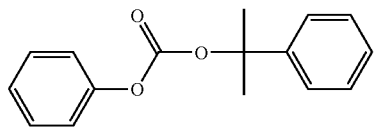

Thermal degradation of 2-phenyl-2-propyl phenyl carbonate was carried out in solution in deuterated o-dichlorobenzene $C_6D_4Cl_2$ at 380 K (107° C.). Progress of the decomposition was followed by NMR. The degradation reaction is:

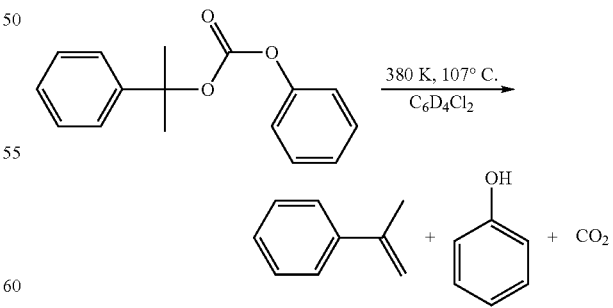

Figure 1:
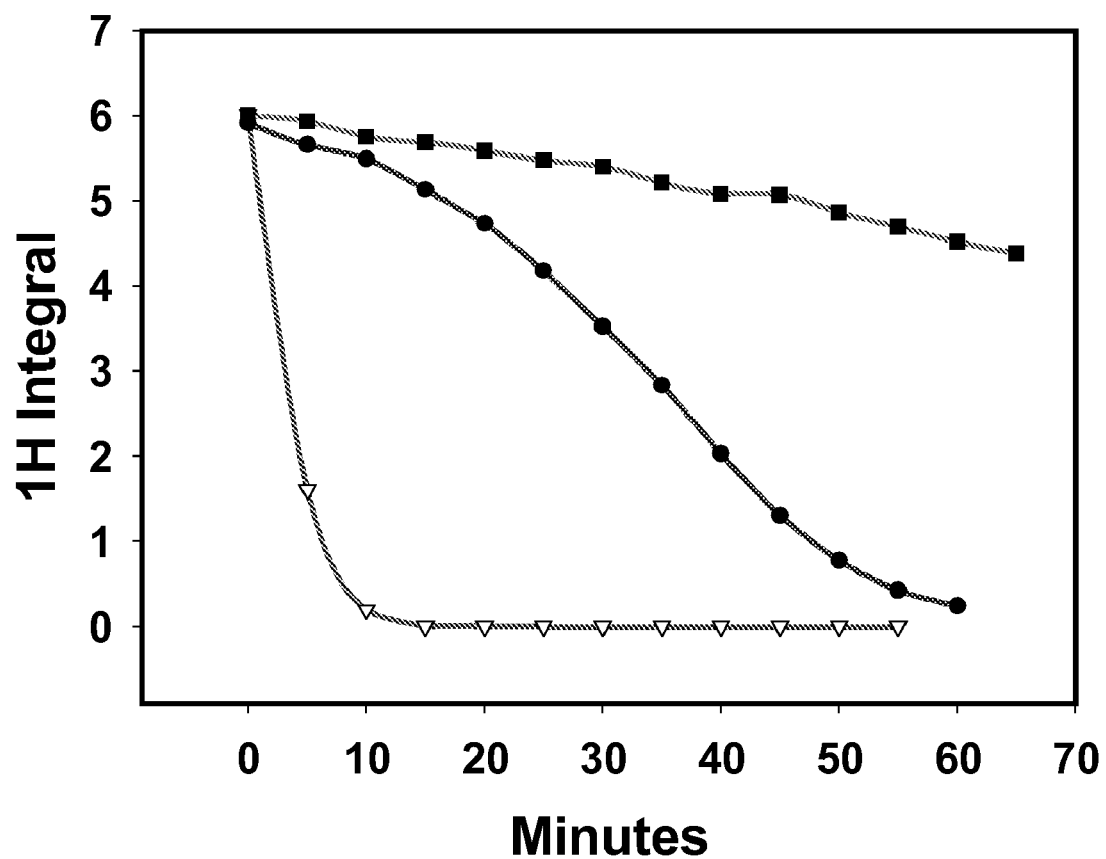
FIG. 1 shows proton NMR signals measured during the decomposition of the compound tested in Example 1.

Results are shown in FIG. 1. Thermal decomposition at 380 Kelvin of Carbonic acid 1-methyl-1-phenyl-ethyl ester phenyl ester was studied by 1H NMR spectra taken at five minute intervals. Almost total decomposition of the compound itself occurs over ca 1 hour (black circles). Addition of phenol increases the rate dramatically (open triangles), while addition of triethylamine retards decomposition (black squares).

EXAMPLE 2

Preparation and study of thermal decomposition of Malonic acid bis-(1-methyl-1-phenyl-ethyl) ester

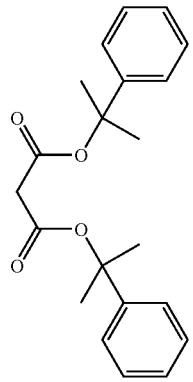

2-Phenyl-2-propanol (14 g, 0.1 mol) and malonic acid (5.5 g, 0.05 mol) was dissolved in acetonitrile (200 mL) and added dicyclohexylcarbodiimide (20 g, 0.1 mol). Cooling in an ice bath was necessary to keep the temperature below 30° C. Stirring at RT was continued overnight in order to complete the reaction. Next day the dicyclohexylurea was removed by filtration and the filter cake was washed with acetonitrile (ca 50 mL). The solvent was removed in vacuum to give a slightly yellow oil. Yield: 13.5 g, 79.4%.

Figure 2:
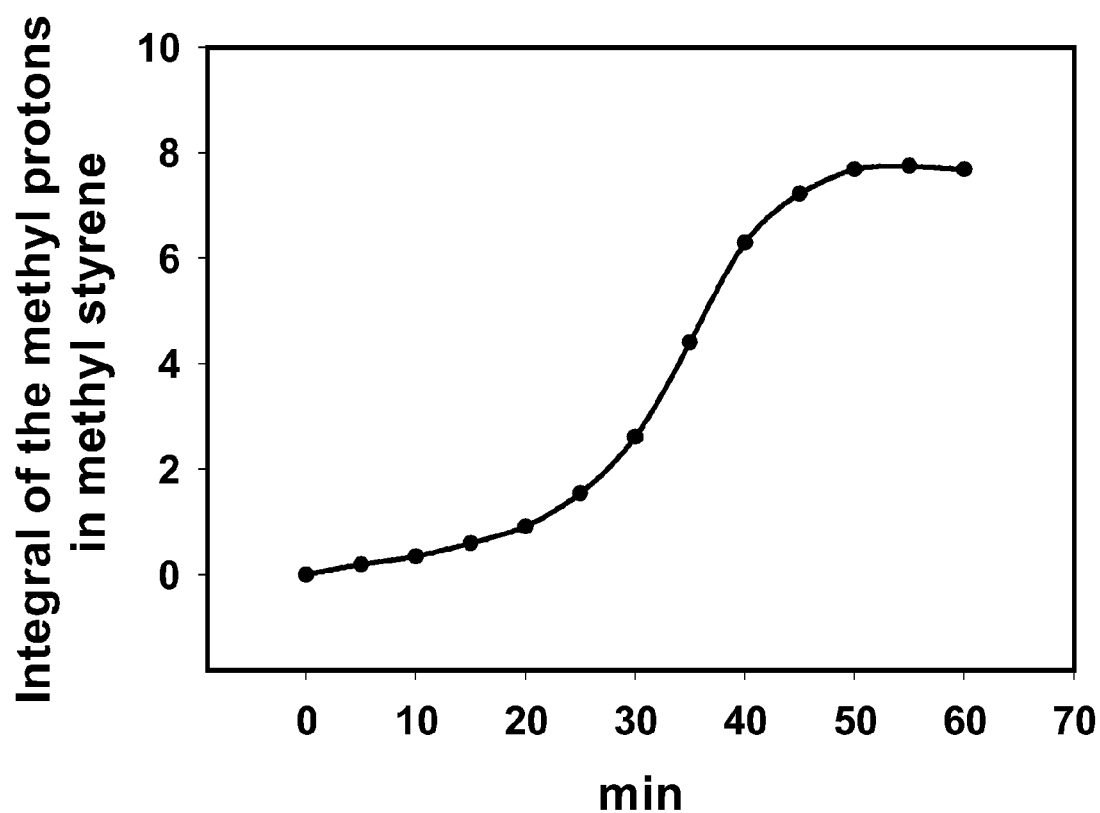
FIG. 2 shows proton NMR signals measured during the decomposition of the compound tested in Example 2.

Thermo cleavage data in solution is shown in FIG. 2. Thermal decomposition of acid bis-(1-methyl-1-phenyl-ethyl) ester was studied by 1H NMR. In this case the increase in the intensity of the signal due to the methyl protons in the product (1-methyl-styrene) was followed as a function of time.

EXAMPLE 3

Preparation and thermal decomposition of Malonic acid bis-[1-(4-chloro-phenyl)-1-methyl-ethyl] ester

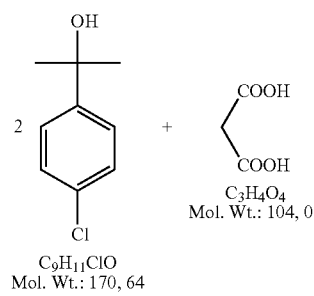

-continued

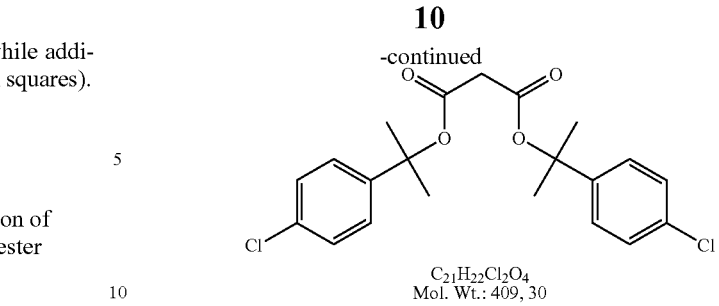

$C_{21}H_{22}Cl_2O_4$
Mol. Wt.: 409, 30

Malonic acid (10.5 g, 0.10 mol) and 2-(4-chlorophenyl)-propan-2-ol (35 g, (0.20 mol) were dissolved in acetonitrile (400 mL) and cooled in an ice bath while dicyclohexylcarbodiimide (42 g 0.2 mol) was added in portions over 10 min. Stirring of the reaction mixture was continued for 48 hours to complete the reaction. The reaction mixture was then filtered to remove dicyclohexylurea and evaporated to give the product as a yellow oil. Yield: 43 g, >100%. 1H NMR showed some starting alcohol present. A flash column on silica with petrol ethyl acetate (4:1) gave a small sample that crystallized on standing. The raw product was then triturated with 2 volumes of methanol and seeded to induce crystallization. The white product was filtered of and dried in vacuum. Yield: 24 g. 1H and 13C NMR was now in accordance with the product together with small amount of methanol.

Figure 3:
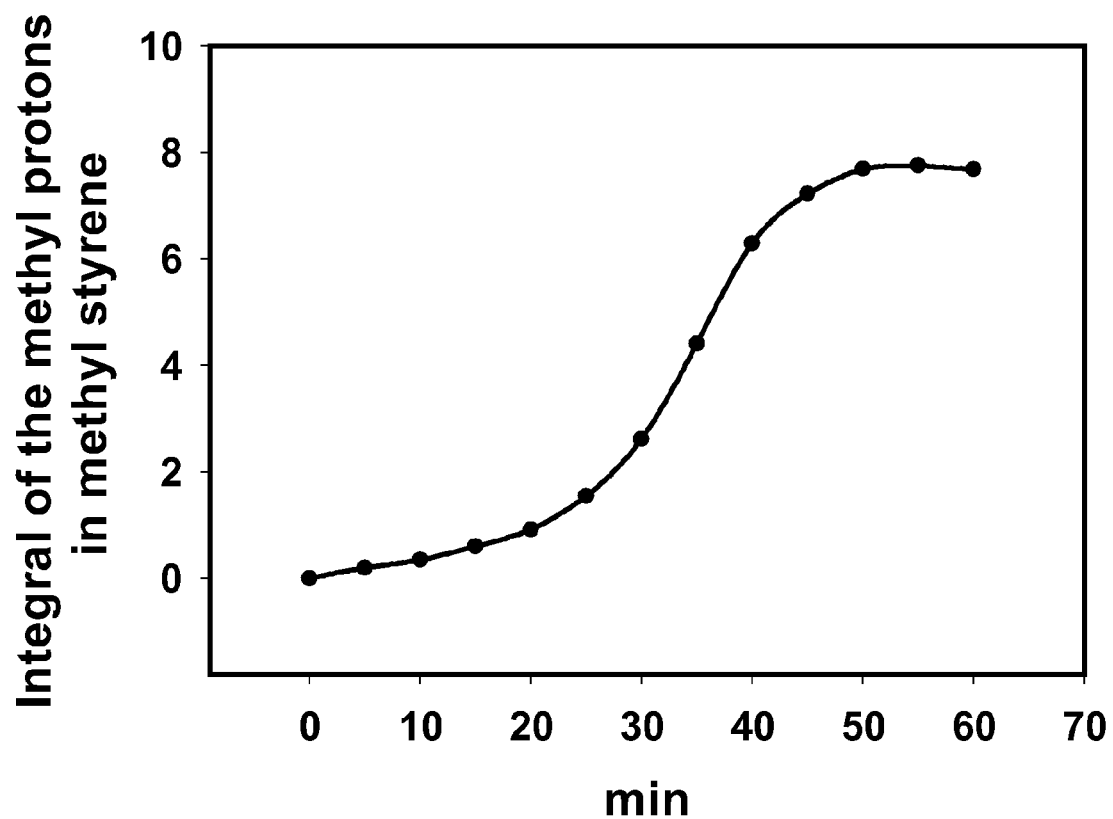
FIG. 3 shows proton NMR signals measured during the decomposition of the compound tested in Example 3. Thermal decomposition of malonic acid bis-[1-(4-chlorophenyl)-1-methyl-ethyl] ester was studied by 1H NMR. The integral of the signal due to methyl protons are followed as a function of time.

Thermo cleavage data in solution is shown in FIG. 3. 20 mg malonic acid bis-[1-(4-chlorophenyl)-1-methyl-ethyl] ester was dissolved in deuterated o-dichlorobenzene in an NMR tube. The decomposition was studied by obtaining 1H NMR spectra at five minute intervals while keeping the sample at a temperature of 400 Kelvin (127° C.). The intensity of the signal originating from the methyl groups (at 1.47 ppm) decreased along a sigmoid curve as seen in the figure. The decomposition can be explained by the following chemical reaction:

Scheme 1. Thermal decomposition of malonic acid bis-[1-(4-chlorophenyl)-1-methyl-ethyl] ester.

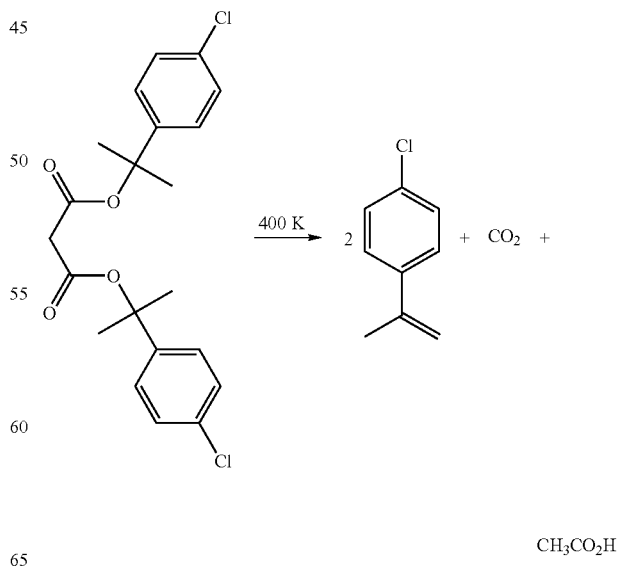

EXAMPLE 4

Preparation of Malonic acid bis-(1-phenyl-ethyl) ester

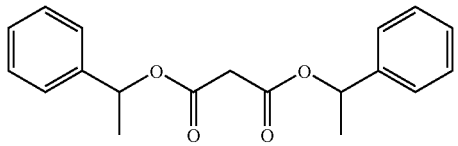

Malonic acid (12 g, 0.11 mol) was dissolved in acetonitrile (450 mL) in an Erlenmeyer flask (1 L) together with 1-phenyl-ethanol (26 g, 0.22 mol). Dicyclohexylcarbodiimide (45 g) was added in portions and with cooling over 10 min so the temperature did not exceed 30° C. A precipitate of dicyclohexyl urea formed almost immediately. Stirring at RT continued over the week-end to complete the reaction. Dicyclohexyl urea was removed by filtration and the filter cake was washed with addition acetonitrile (10 mL). The combined solution was evaporated in vacuum to give the crude product as colourless oil. Yield: 29 g, 93%.

Printing Formulation Examples

The preparation of inks for printing was carried out by mixing a solution of the desired polymer material in a volatile solvent with the carbonic acid ester followed by evaporation of the volatile solvent resulting in an ink/paste suitable for printing or coating.

EXAMPLE 5

2 mL of a 10 mg mL$^{-1}$ solution of poly-3-hexylthiophene in chloroform was mixed with 2 mL of a 10 mg mL$^{-1}$ solution of phenyl-C$_{61}$-butyric acid methyl ester in chloroform and added to 2 mL of carbonic acid 1-ethyl-1,4,8-trimethyl-nonyl ester phenyl ester whereby the mixture acquired a purple colour. After thorough mixing and rotary evaporation an ink for printing was obtained. Screen printing of this ink on an indium tin oxide substrate was followed by thermocleavage at 200° C. for 9 hours. Evaporation onto this of an aluminium electrode gave a polymer photovoltaic device with an active area of 10 cm$^2$. The open circuit voltage, $V_{oc}$, Short circuit current, $I_{sc}$, fill factor, FF, and efficiency, η, were respectively 0.40 V, −18 mA, 25% and 0.18% under simulated sunlight (AM1.5, 1000 W m$^{-2}$).

EXAMPLE 6

2 mL of a 20 mg mL$^{-1}$ of poly-3-hexylthiophene dissolved in chloroform was mixed with 2 mL of a 10 mg mL$^{-1}$ solution of phenyl-C$_{61}$-butyric acid methyl ester in chloroform and added to 2 mL of carbonic acid 1-ethyl-1,4,8-trimethyl-nonyl ester phenyl ester whereby the mixture acquired a purple colour. After thorough mixing and rotary evaporation an ink for printing was obtained. Screen printing of this ink onto an indium tin oxide substrate was followed by thermocleavage at 200° C. for 9 hours. Evaporation onto this of an aluminium electrode gave a polymer photovoltaic device with an active area of 10 cm$^2$. The open circuit voltage, $V_{oc}$, Short circuit current, $I_{sc}$, fill factor, FF, and efficiency, η, were respectively 0.45 V, −12 mA, 25% and 0.13% under simulated sunlight (AM1.5, 1000 W m$^{-2}$).

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'.

The invention claimed is:

1. A non-volatile printing or coating composition comprising a material to be deposited on a substrate and a non-volatile liquid vehicle for said material, wherein the liquid vehicle is cleavable by heating said composition to a temperature not exceeding 200° C. without decomposition of said material, cleavage of said vehicle producing decomposition products that are more volatile than said vehicle and which can be evaporated to dry the composition, wherein said liquid vehicle is of the formula:

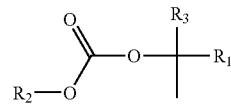

wherein $R_1$ is an aliphatic or aromatic substituent of more than three carbon atoms, $R_2$ is an organic substituent and $R_3$ is $C_{1-3}$ alkyl or is of the formula:

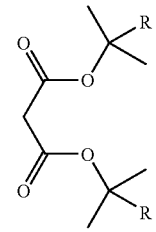

wherein R is an aliphatic or aromatic substituent of more than three carbon atoms and all of the decomposition products of said vehicle produced by said cleavage upon heating have a boiling point at atmospheric pressure of below 200° C., wherein the material to be deposited comprises an electrically conductive polymer, a photovoltaic polymer, or an electroluminescent polymer.

2. A composition as claimed in claim 1, wherein the vehicle decomposes at a temperature of below 200° C.

3. A composition as claimed in claim 1, wherein the composition is a printing ink.

4. A composition as claimed in claim 1, wherein the material to be deposited comprises one or more of a poly(phenylenevinylene) (PPV), poly(p-phenyleneethynylene) (PPE), or poly(arylene) polymer.

5. A composition as claimed in claim 1, wherein the material to be deposited is poly[2-methoxy-5-(2'-ethylhexyloxy)-p-phenylenevinylene] (MEH-PPV), poly[2-methoxy-5-(3',7'-dimethyloctyl)-p-phenylenevinylene] (MDMO-PPV), poly(3-hexylthiophene) (P3HT), poly(N-phenylamino-1,4-phenylene-1,2-ethylene-1,4-(2,5-dioctoxy)-phenylene-1,2-ethylene-1,4-phenylene) (PA-PPV), or poly(9,9'-dioctylfluorene-co-bithiophene) (PDFTH).

6. A printing or coating composition comprising a material to be deposited on a substrate and a non-volatile liquid vehicle for said material, wherein the liquid vehicle is cleavable by heating said composition to a temperature not exceeding 200° C. without decomposition of said material, cleavage of said vehicle producing decomposition products that are more volatile than said vehicle and which can be evaporated to dry the composition, further comprising a filler or viscosity modifier which is solid at 25° C. and which is cleavable without decomposition of said material.

7. A composition as claimed in claim 6, wherein the filler or viscosity modifier is cleavable by heating and/or by acidification.

8. A method of applying a material to a substrate comprising applying to the substrate a printing or coating composition comprising a material to be deposited on a substrate and a non-volatile liquid vehicle for said material, wherein the liquid vehicle is cleavable by heating said composition to a temperature not exceeding 200° C. without decomposition of said material, cleavage of said vehicle producing decomposition products that are more volatile than said vehicle and which can be evaporated to dry the composition, heating the composition to decompose the vehicle component of the composition, and drying the composition.

9. A method as claimed in claim 8, wherein the composition is applied to the substrate by printing, spin coating, drop casting, casting, or painting.

10. A method as claimed in claim 9, wherein the composition is applied to the substrate by screen printing.

11. A composition as claimed in claim 1, further containing in said material to be deposited a fullerene or fullerene compound.

* * * * *